(12) United States Patent  
Zhao et al.

(10) Patent No.: US 11,356,442 B2  
(45) Date of Patent: Jun. 7, 2022

(54) WEARABLE DEVICE-BASED IDENTITY AUTHENTICATION METHOD AND SYSTEM

(71) Applicants: QUANTUMCTEK CO., LTD., Anhui (CN); SHANDONG INSTITUTE OF QUANTUM SCIENCE AND TECHNOLOGY CO., LTD., Shandong (CN)

(72) Inventors: Yong Zhao, Jinan (CN); Chunhua Liu, Jinan (CN)

(73) Assignees: QUANTUMCTEK CO., LTD., Hefei (CN); SHANDONG INSTITUTE OF QUANTUM SCIENCE AND TECHNOLOGY CO., LTD., Jinan (CN)

( * ) Notice: Subject to any disclaimer, the term of this patent is extended or adjusted under 35 U.S.C. 154(b) by 10 days.

(21) Appl. No.: 16/978,119

(22) PCT Filed: Feb. 28, 2019

(86) PCT No.: PCT/CN2019/076403  
§ 371 (c)(1),  
(2) Date: Sep. 3, 2020

(87) PCT Pub. No.: WO2019/170026  
PCT Pub. Date: Sep. 12, 2019

(65) Prior Publication Data  
US 2021/0014226 A1  Jan. 14, 2021

(30) Foreign Application Priority Data  
Mar. 9, 2018 (CN) .......................... 201810194979.9

(51) Int. Cl.  
*H04L 9/40* (2022.01)  
*H04L 9/32* (2006.01)  
(Continued)

(52) U.S. Cl.  
CPC .......... *H04L 63/0876* (2013.01); *G06F 1/163* (2013.01); *G06N 10/00* (2019.01);  
(Continued)

(58) Field of Classification Search  
CPC ... H04L 63/0876; H04L 9/3234; H04W 12/33  
See application file for complete search history.

(56) References Cited

U.S. PATENT DOCUMENTS

| 2013/0101121 A1* | 4/2013 | Nordholt | H04L 9/3226 380/279 |
| 2018/0019878 A1* | 1/2018 | Jiang | H04L 5/0055 |
| 2019/0095668 A1* | 3/2019 | Gaathon | G01N 21/64 |

FOREIGN PATENT DOCUMENTS

| CN | 201310190418.9 | 5/2013 |
| CN | 201410295802.X | 6/2014 |

(Continued)

OTHER PUBLICATIONS

Zheng, Xiang, A New Method of Biological Quantum Key Distribution for Wireless Body Area Network, Master's Dissertation, Dec. 31, 2014, 67 pages.

(Continued)

*Primary Examiner* — Kristine L Kincaid  
*Assistant Examiner* — Lydia L Noel  
(74) *Attorney, Agent, or Firm* — Maschoff Brennan (57) ABSTRACT

A wearable device-based identity authentication method and system, comprising: a user terminal initiates an authentication request to a target server and provides device information of the user terminal, the target server generates a temporary session, and sends a temporary session ID and the device information to a quantum key distribution network; the quantum key distribution network generates identification information, searches a wearable device bound to the user terminal, and sends the identification information to the (Continued)

wearable device; the wearable device receives and provides the identification information to the user terminal, the user terminal acquires the identification information, and sends verification information to the wearable device and then to the quantum key distribution network; the quantum key distribution network generates an authentication result and sends to the target server; and the target server generates an identification authentication result and sends to the user terminal.

19 Claims, 3 Drawing Sheets

(51) Int. Cl.
*H04W 12/33* (2021.01)
*G06N 10/00* (2022.01)
*G06F 1/16* (2006.01)
*H04L 9/08* (2006.01)

(52) U.S. Cl.
CPC .......... *H04L 9/0852* (2013.01); *H04L 9/3234* (2013.01); *H04L 63/062* (2013.01); *H04L 63/0853* (2013.01); *H04W 12/33* (2021.01)

(56) References Cited

FOREIGN PATENT DOCUMENTS

| CN | 201510598684.4 | | 9/2015 |
|---|---|---|---|
| CN | 106953729 A | * | 7/2017 |
| CN | 107368723 A | | 11/2017 |

OTHER PUBLICATIONS

International Search Report dated May 24, 2019 in related International Application No. PCT/CN2019/076403.

* cited by examiner

WEARABLE DEVICE-BASED IDENTITY AUTHENTICATION METHOD AND SYSTEM

The present application is the U.S. national phase of International Application No. PCT/CN2019/076403, titled "WEARABLE DEVICE-BASED IDENTITY AUTHENTICATION METHOD AND SYSTEM", filed on Feb. 28, 2019, which claims priority to Chinese Patent Application No. 201810194979.9, titled "WEARABLE DEVICE-BASED IDENTITY AUTHENTICATION METHOD AND SYSTEM", filed on Mar. 9, 2018, with the China National Intellectual Property Administration, both of which are incorporated herein by reference in their entirety.

FIELD

The present disclosure relates to the field of information secure authentication, and in particular to an identity authentication method and system based on a wearable device.

BACKGROUND

With the rapid development of mobile Internet, internal business websites of enterprises and public institutions gradually develop towards mobile terminals. In order to provide convenience for staff to understand work content at any time, it is desired to be able to access a server of an internal website via a portable mobile terminal. A loophole in identity authentication may result in data leakage, resulting in an irreparable consequence for an enterprise. Therefore, a secure and reliable login authentication method is indispensable. Existing authentication methods for mobile terminals mainly include a method of performing login authentication by an account number and a password, a method of performing authentication by a dynamic password, and a method of performing authentication by comparing device identification information with device information of a user pre-stored in an authentication server. However, the account number, the password, the dynamic password, and a device ID may be intercepted or leaked. With the popularity of wearable devices, there are many related technologies in which wearable devices are introduced into identity authentication technologies, such as an authentication technology in which a common cryptographic technology is combined with wearable devices, and an authentication technology in which a biometric technology is combined with wearable devices. For example, in "Authentication Method for Wearable Device" (application No. 201510598684.4), lightweight operators such as a pseudo-random function, XOR operation, and a one-way authentication function are introduced into the authentication method, to achieve mutual authentication between a smartphone and a wearable device. In a process that the smartphone interacts with the wearable device, sensitive data such as a pseudo-identity identifier and a pre-shared secret value of the wearable device are transmitted in an anonymous manner so as to ensure security of interactive data. Further, a dynamic update mechanism is introduced, to improve freshness and randomness of a session cycle, and avoid attacks such as a replay attack and a personate attack by a malicious attacker. In "Authentication Method by Wearable Device and Wearable Device" (application No. 201310190418.9), identity authentication information of a user is acquired based on a biological characteristic, and the identity authentication information is transmitted to a terminal via a wearable device for authentication. In addition, in "Authentication Payment Method and Payment Authentication System Based on Wearable Device" (application No. 201410295802.X), payment security is further improved by increasing authentication for a wearable device.

However, the existing authentication method based on a wearable device is usually applied to identity authentication in a process that the wearable device interacts with a user terminal. Further, in a process of transmitting information in the existing authentication method based on a wearable device, an encryption manner based on complexity of a mathematical algorithm is usually adopted. A security mechanism based on a mathematical algorithm is easy to be cracked by the increasingly rapidly developing computing technology. New algorithm loopholes are being constantly discovered, and are very fragile in the face of a future quantum computer, resulting in a severe security risk in the existing authentication method based on a wearable device. It is difficult for the existing authentication method based on a wearable device to adapt to identity authentication of high security requirements.

Therefore, how to improve security of identity authentication for a mobile terminal logging in a target server with the help of a wearable device is a technical problem to be urgently solved by those skilled in the art.

SUMMARY

In order to solve the above problem, an authentication method based on a quantum key and a wearable device is provided according to the present disclosure, for identity authentication of account management and access, so that a reliable authentication link from a user to a user terminal and then to a target server is constructed, and an authentication mechanism of high security is provided.

An identity authentication method based on a wearable device is provided according to a technical solution of the present disclosure. The identity authentication method includes the following steps S1 to S5.

In step S1, a user terminal initiates an authentication request and provides device information of the user terminal to a target server, and the target server receives the authentication request to generate a temporary session, and transmits a temporary session ID and the device information to a quantum key distribution network.

In step S2, the quantum key distribution network receives the temporary session ID and the device information to generate identification information, searches for a wearable device bound to the user terminal, and transmits the identification information to the wearable device.

In step S3, the wearable device receives the identification information and provides the identification information to the user terminal, the user terminal obtains the identification information and transmits verification information to the wearable device, and the wearable device transmits the verification information to the quantum key distribution network.

In step S4, the quantum key distribution network receives the verification information, generates a verification result based on the verification information, and transmits the verification result to the target server.

In step S5, the target server receives the verification result to generate an identity authentication result, and transmits the identity authentication result to the user terminal.

Further, the device information is a device ID of the user terminal or a quantum identity number. The quantum identity number is a unique identifier in an entire network distributed by the quantum key distribution network to the wearable device registered in the network. After the wearable device is bound to the user terminal, the quantum identity number is shared by the wearable device with the user terminal bound to the wearable device.

Further, in a case that the device information is the device ID of the user terminal, searching for the wearable device bound to the user terminal in step S2 includes:

first, searching for a quantum identity number corresponding to the device ID of the user terminal in the quantum key distribution network based on the device ID of the user terminal; and then, searching for a wearable device having the quantum identity number, that is, a wearable device bound to the user terminal, where identity authentication fails if no wearable device having the quantum identity number is found, and device information pre-stored in the quantum key distribution network includes at least a quantum identity number of a wearable device registered in the quantum key distribution network in advance and a device ID of a user terminal bound to the wearable device.

Further, in a case that the device information is the quantum identity number, searching for the wearable device bound to the user terminal in step S2 includes:

searching for, based on the quantum identity number from the user terminal, a wearable device having the quantum identity number, that is, a wearable device bound to the user terminal, from device information pre-stored in the quantum key distribution network, where identity authentication fails if no wearable device having the quantum identity number is found, and the device information pre-stored in the quantum key distribution network includes at least a quantum identity number of a wearable device registered in the quantum key distribution network.

Further, in step S3, the user terminal obtaining the identification information and transmitting the verification information to the wearable device includes:

the user terminal recognizing the identification information, to obtain a temporary session ID and device information included in the identification information; and the user terminal determining whether the device information included in the identification information is identical to the device information of the user terminal, determining whether the temporary session ID included in the identification information corresponds to the authentication request previously initiated by the user terminal to the target server, and transmitting a determination result as the verification information to the wearable device.

Further, in step S4, the quantum key distribution network generating the verification result based on the verification information includes:

generating a verification result indicating successful authentication in a case that the device information included in the verification information is identical to the device information of the user terminal and the temporary session ID included in the verification information corresponds to the authentication request previously initiated by the user terminal to the target server; otherwise, generating a verification result indicating unsuccessful authentication.

Further, in step S3, the wearable device further collects biometric information of a user, and transmits the biometric information to the quantum key distribution network; the quantum key distribution network matches the biometric information with pre-stored biometric information on receipt of the biometric information, generates a verification result indicating successful authentication in a case that the matching for the biometric information succeeds, the device information included in the verification information is identical to the device information of the user terminal and the temporary session ID included in the identification information corresponds to the authentication request previously initiated by the user terminal to the target server, otherwise, generates a verification result indicating unsuccessful authentication.

Further, the target server shares the temporary session ID with the user terminal after generating the temporary session. In step S3, the user terminal obtaining the identification information and transmitting the verification information to the wearable device includes:

the user terminal obtaining the identification information, and transmitting all temporary session IDs currently initiated by the user terminal and the device information of the user terminal to the wearable device as the verification information.

Further, in step S4, generating the verification result based on the verification information includes:

the quantum key distribution network searching for, from all received temporary session IDs initiated by the user terminal and the device information, a combination of a temporary session ID and device information in which the device information is identical to the device information received in step S2 and the temporary session ID is identical to the temporary session ID received in step S2;

the quantum key distribution network generating a verification result indicating successful authentication in a case that the combination is found; otherwise, the quantum key distribution network generating a verification result indicating unsuccessful authentication.

Further, in step S5, generating the identity authentication result and transmitting the identity authentication result to the user terminal include:

generating a message indicating successful authentication or unsuccessful authentication for login of the user terminal to the target server, and transmitting the message to the user terminal.

Further, the identification information is in a form of a QR code.

Further, the QR code is dynamic. If the QR code is not scanned by a user within a period of time after being displayed on the wearable device, the quantum key distribution network regenerates a new QR code at time intervals and transmits the new QR code to the wearable device for continuous dynamic update.

Further, the quantum key distribution network and the target server both pre-store a first shared key for encrypting and decrypting communication data between the quantum key distribution network and the target server.

Further, the wearable device and the quantum key distribution network both pre-store a second shared key for encrypting and decrypting communication data between the wearable device and the quantum key distribution network.

Further, the wearable device is connected to the user terminal in a wireless manner or a wired manner.

Further, the user terminal and the wearable device both are registered in the quantum key distribution network in advance, and obtain paired third shared keys for encrypting and decrypting communication data between the user terminal and the wearable device.

An identity authentication system based on a wearable device is further provided according to a second aspect of the present disclosure. The identity authentication system includes a user terminal, a target server, a quantum key distribution network and a wearable device.

The user terminal is configured to initiate an authentication request and provide device information of the user terminal to the target server, obtain identification information provided by the wearable device to the user terminal, transmit verification information to the wearable device, and receive an identity authentication result transmitted by the target server.

The target server is configured to receive the authentication request to generate a temporary session, transmit a temporary session ID and the device information to the quantum key distribution network, receive a verification result transmitted by the quantum key distribution network to generate the identity authentication result, and transmit the identity authentication result to the user terminal.

The quantum key distribution network is configured to receive the temporary session ID and the device information to generate the identification information, search for a wearable device bound to the user terminal, transmit the identification information to the wearable device, receive the verification information transmitted by the wearable device, generate the verification result based on the verification information, and transmit the verification result to the target server.

The wearable device is configured to receive the identification information, provide the identification information to the user terminal, receive the verification information transmitted by the user terminal, and transmit the verification information to the quantum key distribution network.

Further, the device information is a device ID of the user terminal or a quantum identity number. The quantum identity number is a unique identifier in an entire network distributed by the quantum key distribution network to the wearable device registered in the network. After the wearable device is bound to the user terminal, the quantum identity number is shared by the wearable device with the user terminal bound to the wearable device.

Further, in a case that the device information is the device ID of the user terminal, searching for the wearable device bound to the user terminal includes:

first, searching for a quantum identity number corresponding to the device ID of the user terminal in the quantum key distribution network based on the device ID of the user terminal; and then, searching for a wearable device having the quantum identity number, that is, a wearable device bound to the user terminal, where identity authentication fails if no wearable device having the quantum identity number is found, and device information pre-stored in the quantum key distribution network includes at least a quantum identity number of a wearable device registered in the quantum key distribution network in advance and a device ID of a user terminal bound to the wearable device.

Further, in a case that the device information is the quantum identity number, searching for the wearable device bound to the user terminal includes:

searching for, based on the quantum identity number from the user terminal, a wearable device having the quantum identity number, that is, a wearable device bound to the user terminal, from device information pre-stored in the quantum key distribution network, where identity authentication fails if no wearable device having the quantum identity number is found, and the device information pre-stored in the quantum key distribution network includes at least a quantum identity number of a wearable device registered in the quantum key distribution network.

Further, the user terminal obtaining the identification information and transmit the verification information to the wearable device includes:

recognizing the identification information, and obtaining a temporary session ID and device information included in the identification information; and determining whether the device information included in the identification information is identical to the device information of the user terminal, determining whether the temporary session ID included in the identification information corresponds to the authentication request previously initiated by the user terminal to the target server, and transmitting a determination result as the verification information to the wearable device.

Further, the quantum key distribution network generates the verification result based on the verification information by:

generating a verification result indicating successful authentication in a case that the device information included in the verification information is identical to the device information of the user terminal and the temporary session ID included in the verification information corresponds to the authentication request previously initiated by the user terminal to the target server; otherwise, generating a verification result indicating unsuccessful authentication.

Further, the wearable device is further configured to collect biometric information of a user, and transmit the biometric information to the quantum key distribution network. The quantum key distribution network is configured to match the biometric information with pre-stored biometric information on receipt of the biometric information, generate a verification result indicating successful authentication in a case that the matching for the biometric information succeeds, the device information included in the verification information is identical to the device information of the user terminal and the temporary session ID included in the verification information corresponds to the authentication request previously initiated by the user terminal to the target server, otherwise generate a verification result indicating unsuccessful authentication.

Further, the target server shares the temporary session ID with the user terminal after generating the temporary session. The user terminal obtaining the identification information and transmitting the verification information to the wearable device includes: the user terminal obtaining the identification information, and transmitting all temporary session IDs currently initiated by the user terminal and the device information of the user terminal to the wearable device as the verification information.

Further, the quantum key distribution network generating the verification result based on the verification information:

the quantum key distribution network searching for, from all received temporary session IDs initiated by the user terminal and the device information, a combination of a temporary session ID and device information in which the device information is identical to the device information received from the target server and the temporary session ID is identical to the temporary session ID received from the target server;

the quantum key distribution network generating a verification result indicating successful authentication in a case that the combination is found; otherwise, the quantum key distribution network generating a verification result indicating unsuccessful authentication.

Further, the target server generating the identity authentication result and transmitting the identity authentication result to the user terminal includes: generating a message indicating successful authentication or unsuccessful authentication for login of the user terminal to the target server, and transmitting the message to the user terminal.

Further, the identification information is in a form of a QR code.

Further, the QR code is dynamic. If the QR code is not scanned by a user within a period of time after being displayed on the wearable device, the quantum key distribution network regenerates a new QR code at time intervals and transmits the new QR code to the wearable device for continuous dynamic update.

Further, the quantum key distribution network and the target server both pre-store a first shared key for encrypting and decrypting communication data between the quantum key distribution network and the target server.

Further, the wearable device and the quantum key distribution network both pre-store a second shared key for encrypting and decrypting communication data between the wearable device and the quantum key distribution network.

Further, the wearable device is connected to the user terminal in a wireless manner or a wired manner.

Further, the user terminal and the wearable device both are registered in the quantum key distribution network in advance, and obtain paired third shared keys for encrypting and decrypting communication data between the user terminal and the wearable device.

A quantum key distribution network for identity authentication is further provided according to a third aspect of the present disclosure. The quantum key distribution network is configured to:

receive device information of a user terminal to generate identification information;

search for a wearable device bound to the user terminal, and transmit the identification information to the wearable device; and receive verification information transmitted by the wearable device, and generate a verification result based on the verification information.

Further, the device information is provided by the user terminal when initiating an authentication request to a target server.

Further, the identification information further includes a temporary session ID. The temporary session ID is generated by the target server on receipt of the authentication request.

Further, the verification information is transmitted by the user terminal to the wearable device after the user terminal obtains the identification information from the wearable device.

Further, the device information is a device ID of the user terminal or a quantum identity number. The quantum identity number is a unique identifier in an entire network distributed by the quantum key distribution network to the wearable device registered in the network. After the wearable device is bound to the user terminal, the quantum identity number is shared by the wearable device with the user terminal bound to the wearable device.

Further, in a case that the device information is the device ID of the user terminal, searching for the wearable device bound to the user terminal includes:

first, searching for a quantum identity number corresponding to the device ID of the user terminal in the quantum key distribution network based on the device ID of the user terminal; and then, searching for a wearable device having the quantum identity number, that is, a wearable device bound to the user terminal, where identity authentication fails if no wearable device having the quantum identity number is found, and device information pre-stored in the quantum key distribution network includes at least a quantum identity number of a wearable device registered in the quantum key distribution network in advance and a device ID of a user terminal bound to the wearable device.

Further, in a case that the device information is the quantum identity number, searching for the wearable device bound to the user terminal includes:

searching for, based on the quantum identity number from the user terminal, a wearable device having the quantum identity number, that is, a wearable device bound to the user terminal, from device information pre-stored in the quantum key distribution network, where identity authentication fails if no wearable device having the quantum identity number is found, and the device information pre-stored in the quantum key distribution network includes at least a quantum identity number of a wearable device registered in the quantum key distribution network.

Further, the target server shares the temporary session ID with the user terminal after generating a temporary session. The verification information includes all temporary session IDs currently initiated by the user terminal and device information of the user terminal. The quantum key distribution network generating the verification result based on the verification information includes:

the quantum key distribution network searching for, from all received temporary session IDs initiated by the user terminal and the device information, a combination of a temporary session ID and device information in which the device information is identical to the device information received from the target server and the temporary session ID is identical to the temporary session ID received from the target server;

the quantum key distribution network generating a verification result indicating successful authentication in a case that the combination is found; otherwise, the quantum key distribution network generating a verification result indicating unsuccessful authentication.

Further, the quantum key distribution network and the target server both pre-store a first shared key for encrypting and decrypting communication data between the quantum key distribution network and the target server.

Further, the wearable device and the quantum key distribution network both pre-store a second shared key for encrypting and decrypting communication data between the wearable device and the quantum key distribution network.

A wearable device for identity authentication is further provided according to a fourth aspect of the present disclosure. The wearable device is bound to a user terminal and is configured to:

provide the user terminal with identification information transmitted by a quantum key distribution network; and receive verification information transmitted by the user terminal after obtaining the identification information, and transmit the verification information to the quantum key distribution network for authentication.

Further, the user terminal provides device information when initiating an authentication request to a target server. The identification information is generated based on the device information.

Further, the quantum key distribution network receives the device information provided by the user terminal when the user terminal initiates the authentication request to the target server and a temporary session ID generated by the target server on receipt of the authentication request. The identification information is generated based on the device information and the temporary session ID.

Further, the wearable device is registered in the quantum key distribution network, stores a unique quantum identity number in the entire network, and is capable of storing keys, encrypting and decrypting data and transmitting and receiving data.

Further, the wearable device is further configured to collect biometric information of a user, and transmit the biometric information to the quantum key distribution network.

Further, the identification information is in a form of a QR code.

Further, the wearable device and the quantum key distribution network both pre-store a second shared key for encrypting and decrypting communication data between the wearable device and the quantum key distribution network.

Further, the user terminal and the wearable device both are registered in the quantum key distribution network in advance, and obtain paired third shared keys for encrypting and decrypting communication data between the user terminal and the wearable device.

A user terminal is further provided according to a fifth aspect of the present disclosure. The user terminal is bound to a wearable device, and is configured to:

initiate an authentication request and provide device information of the user terminal to a target server; and obtain identification information from the wearable device, and transmit verification information to the wearable device, where the wearable device transmits the verification information to a quantum key distribution network for authentication to obtain a verification result, and the identification information is generated by the quantum key distribution network based on the device information provided by the user terminal when the user terminal initiates the authentication request to the target server.

Further, the identification information further includes a temporary session ID. The temporary session ID is generated by the target server on receipt of the authentication request.

Further, the user terminal is further configured to receive an identity authentication result. The identity authentication result is generated by the target server based on the verification result transmitted by the quantum key distribution network.

Further, the target server shares the temporary session ID with the user terminal after generating a temporary session. The verification information includes all temporary session IDs currently initiated by the user terminal and the device information of the user terminal.

Further, the user terminal and the wearable device both are registered in the quantum key distribution network in advance, and obtain paired third shared keys for encrypting and decrypting communication data between the user terminal and the wearable device.

A target server is further provided according to a sixth aspect of the present disclosure. The target server is configured to:

receive an authentication request transmitted by a user terminal, and transmit device information to a quantum key distribution network; and transmit an authentication result from the quantum key distribution network to the user terminal.

Further, the target server is further configured to generate a temporary session ID on receipt of the authentication request transmitted by the user terminal, and transmit the temporary session ID to the quantum key distribution network.

Further, the target server is capable of both identity authentication and providing service access to the user terminal. Alternatively, the target server is capable of identity authentication only, and in a case that the target server determines that identity authentication is successful, other servers provide service access to the user terminal.

Further, the quantum key distribution network and the target server both pre-store a first shared key for encrypting and decrypting communication data between the quantum key distribution network and the target server.

Beneficial effects of the present disclosure are as follows.

An identity authentication method for a user terminal to access a third-party target server is provided according to the present disclosure. The method is based on a quantum key distribution network, which provides an authentication service interface to the third-party target server, so as to replace the conventional authentication method based on a mathematical algorithm. Encryption is performed by using a quantum key, such that security for identity authentication is improved.

In the present disclosure, a wearable device is introduced in the identity authentication. Compared with the user terminal, the wearable device is more closely bound to an identity of a specific user, and has higher security. In addition, the wearable device is easy to use, and can effectively improve user experience.

In the present disclosure, a crucial authentication link is protected by using quantum cryptography, thereby having strong resistance against supposititious identification and deciphering.

BRIEF DESCRIPTION OF THE DRAWINGS

The accompanying drawings forming a part of the present disclosure are used to provide a further understanding of the present disclosure. Exemplary embodiments of the present disclosure and their descriptions are used to explain the present disclosure rather than constitute an undue limitation on the present disclosure.

DETAILED DESCRIPTION OF EMBODIMENTS

It should be noted that the following detailed description is illustrative and is intended to provide a further explanation of the present disclosure. Unless otherwise specified, all technical and scientific terms used herein have the same meaning as commonly understood by those skilled in the technical field to which the present disclosure relates.

It should be noted that the terminology used herein is only for describing specific embodiments, and is not intended to limit exemplary embodiments of the present disclosure. As used herein, unless the context clearly indicates otherwise, a singular form is also intended to include a plural form. In addition, it should further be understood terms "comprising" and/or "including" used in this specification indicates that there is a feature, a step, an operation, a device, a component, and/or a combination thereof.

In a case of no conflict, the embodiments of the present disclosure and features in the embodiments may be combined with each other.

The mobile terminal in this disclosure may include but is not limited to a mobile phone and a tablet. Any electronic device capable of network connection is applicable to the mobile terminal in the present disclosure. The wearable device in this disclosure may include but is not limited to a smart ring, a smart bracelet, a smart watch, a smart necklace, and other small devices that contact with a human body and are carried around.

First Embodiment

Figure 1:
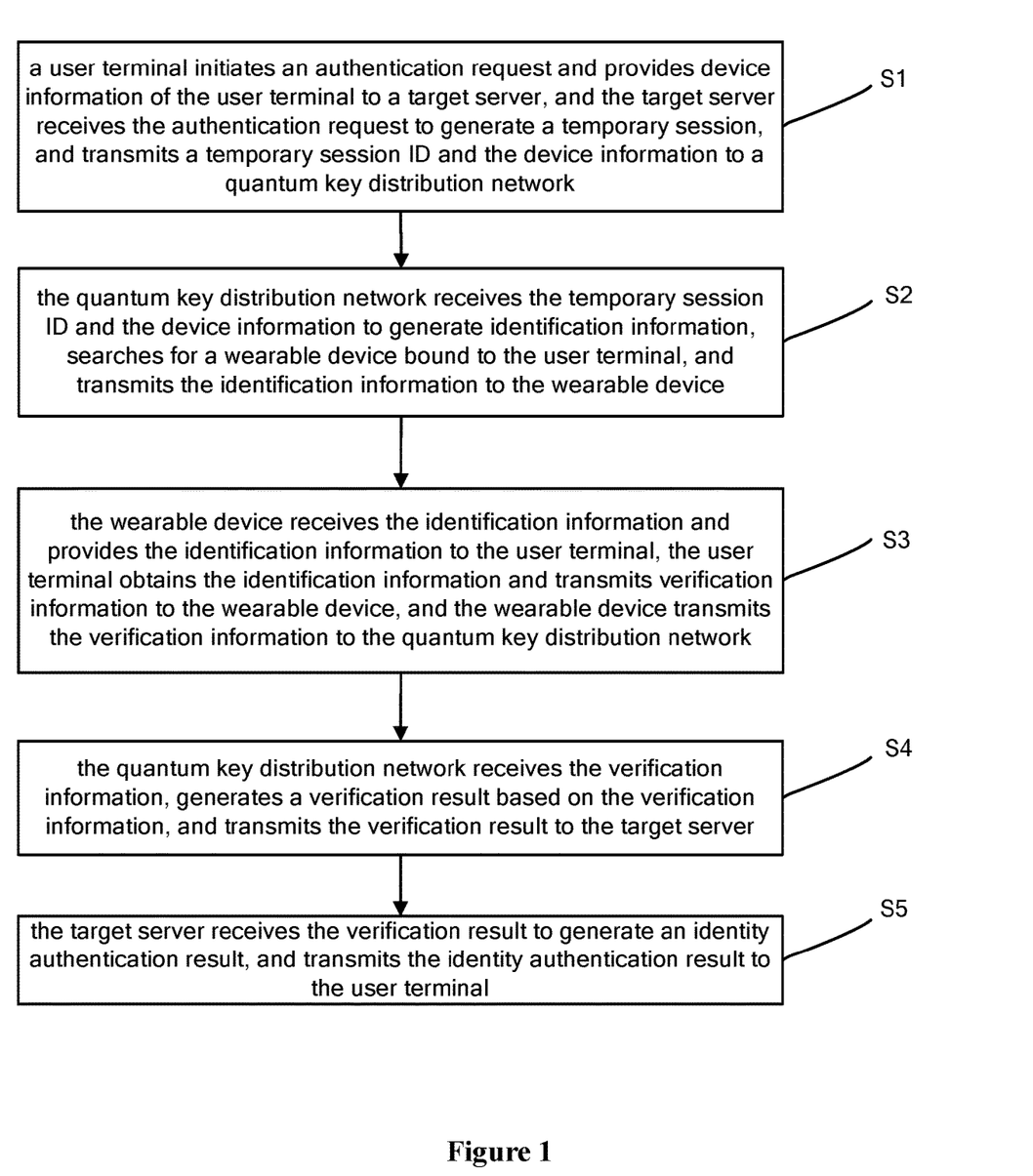
FIG. 1 is a flowchart of an identity authentication method based on a wearable device according to a first embodiment of the present disclosure.

FIG. 1 is a flowchart of an identity authentication method based on a wearable device according to the first embodiment of the present disclosure. As shown in FIG. 1, the identity authentication method includes the following steps S1 to S5.

In step S1, a user terminal initiates an authentication request and provides device information of the user terminal to a target server, and the target server receives the authentication request to generate a temporary session, and transmits a temporary session ID and the device information to a quantum key distribution network.

In step S2, the quantum key distribution network receives the temporary session ID and the device information to generate identification information, searches for a wearable device bound to the user terminal, and transmits the identification information to the wearable device.

In step S3, the wearable device receives the identification information and provides the identification information to the user terminal, the user terminal obtains the identification information and transmits verification information to the wearable device, and the wearable device transmits the verification information to the quantum key distribution network.

In step S4, the quantum key distribution network receives the verification information, generates a verification result based on the verification information, and transmits the verification result to the target server.

In step S5, the target server receives the verification result to generate an identity authentication result, and transmits the identity authentication result to the user terminal.

The target server may be capable of both identity authentication and providing service access to the user terminal. Alternatively, the target server may be capable of identity authentication only, and in a case that the target server determines that identity authentication is successful, other servers provide service access to the user terminal.

Figure 2:
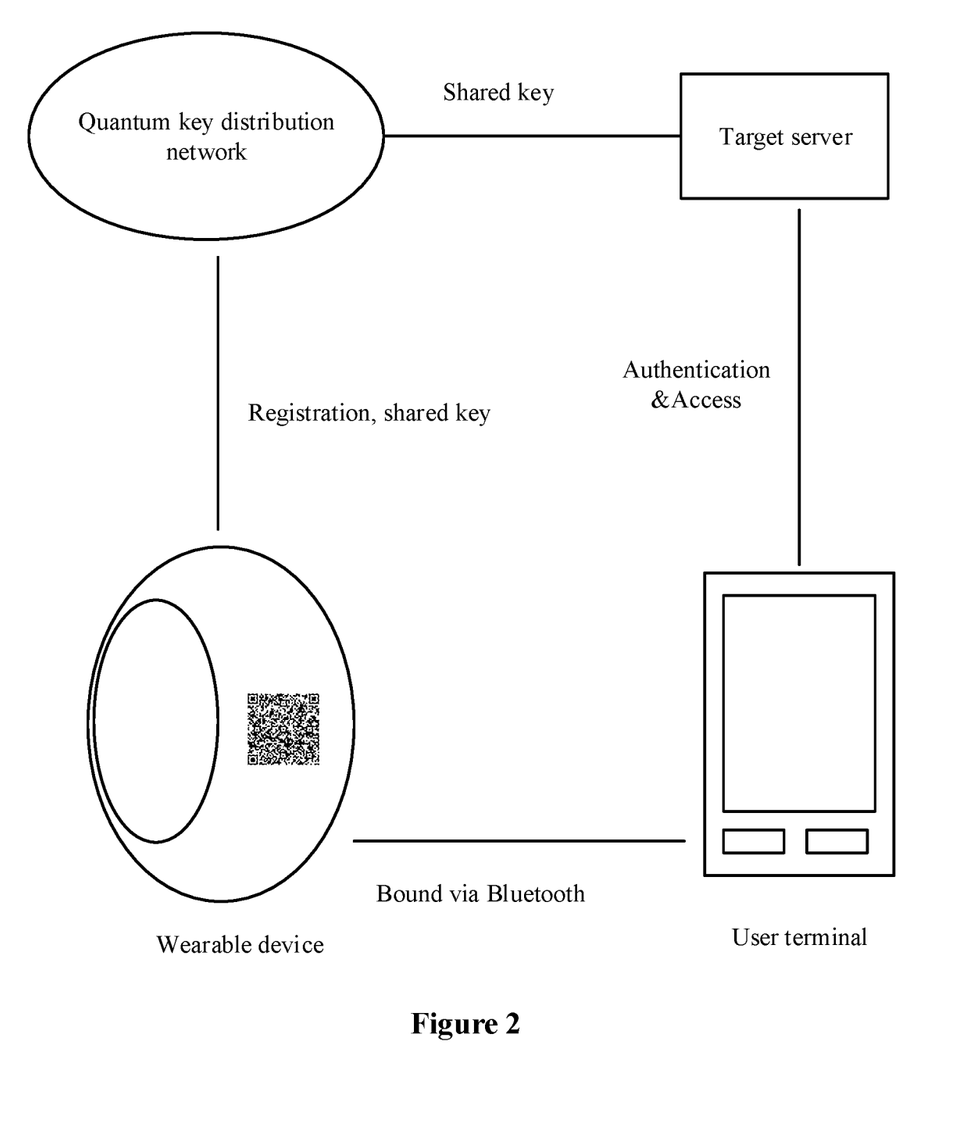
FIG. 2 is a schematic diagram showing connection and communication among devices according to the first embodiment of the present disclosure.

Devices are connected as shown in FIG. 2.

The quantum key distribution network provides an interface for the target server, communicates with the target server, and distributes a first shared key to itself and the target server. The first shared key is used for encrypting and decrypting communication data between the quantum key distribution network and the target server. Optionally, the quantum key distribution network may share a key with the target server in other forms. For example, the quantum key distribution network first generates a quantum key, and then transmits the quantum key to the target server via other relatively reliable media (such as a VPN, a mobile storage medium), so as to share the quantum key with the target server.

The wearable device is registered in the quantum key distribution network. The quantum key distribution network distributes a second shared key to itself and the wearable device. The second shared key is used for encrypting and decrypting communication data between the quantum key distribution network and the wearable device.

The wearable device is registered in the quantum key distribution network as follows. A holder of the wearable device (which may be an individual, or a manufacturer or seller of the wearable device) first goes through relevant procedures of registration for network access at an operation organization of the quantum key distribution network. The operation organization of the quantum key distribution network is responsible for reviewing a network access application of a user. If the application is granted, a unique quantum identity number in the entire network distributed by the quantum key distribution network is issued to each wearable device applying for network access. The quantum identification number is stored in a permanent storage medium of the wearable device applying for network access. Information transmitted in each identity authentication is few; therefore, even in case of applying one-time-pad, the shared key(s) pre-stored in the wearable device during registration and shared by the wearable device with the quantum key distribution network can be usable for a long period of time. In a case that higher security is desired, the shared key stored in the wearable device may be periodically changed. One method for changing the shared key stored in the wearable device is that the quantum key distribution network generates a new shared key, encrypts the new shared key with the old shared key, and issues the new shared key to the wearable device.

The wearable device is connected to the user terminal in a wireless manner or a wired manner.

Since the user terminal is very close to the wearable device when performing this process, the user terminal and the wearable device may be bound and transmit information to each other via Bluetooth. Under a more stringent security environment, the user terminal and the wearable device may transmit information to each other in a wired manner.

A security level may be further improved. For example, it is assumed that there is a risk of information leakage within 10 meters around the user, the user terminal and the wearable device may be registered in the quantum key distribution network in advance. The quantum key distribution network distributes a uniform third shared key to the user terminal and the wearable device. Then, communication data between the user terminal and the wearable device is encrypted by using the third shared key.

In order to avoid a replay attack, two devices (for example, the quantum key distribution network and the wearable device, as well as the quantum key distribution network and the target server) that use a quantum key for confidential communication both carry a random code during information transmission. The random code is taken from the quantum key shared with a peer device and used only once. Only when random codes on both sides are identical, this communication is legal and valid.

Optionally, the wearable device may be registered in the quantum key distribution network, to obtain a quantum identity number of the wearable device. In a case that the wearable device is bound to one user terminal, the quantum identity number is shared with the user terminal, and the binding relationship is stored in the quantum key distribution network.

The wearable device may ask the quantum key distribution network to terminate the binding relationship with the user terminal, or apply for a new binding relationship with another user terminal.

Preferably, the device information may be a device ID of the user terminal or a quantum identity number.

In step S1, after generating the temporary session, the target server feeds back the temporary session ID to the user terminal, that is, shares the temporary session ID with the user terminal.

In step S1, before transmitting the temporary session ID and the device information to the quantum key distribution network, the method further includes: encrypting, by the target server, the temporary session ID and the device information by using the first shared key. The first shared key is a shared key between the target server and the quantum key distribution network.

In step S2, the quantum key distribution network receiving the temporary session ID and the device information includes decrypting the temporary session ID and the device information by using the first shared key.

In a case that the device information provided when initiating authentication is the device ID, searching for the wearable device bound to the user terminal in step S2 includes: first, searching for a quantum identity number corresponding to the device ID of the user terminal in the quantum key distribution network based on the device ID of the user terminal; and then, searching for a wearable device having the quantum identity number, that is, a wearable device bound to the user terminal. Identity authentication fails if no wearable device having the quantum identity number is found. Device information pre-stored in the quantum key distribution network includes at least a quantum identity number of a wearable device registered in the quantum key distribution network in advance and a device ID of a user terminal bound to the wearable device.

In a case that the device information provided when initiating authentication is the quantum identity number, searching for the wearable device bound to the user terminal in step S2 includes: searching for, based on the quantum identity number from the user terminal, a wearable device having the quantum identity number, that is, a wearable device bound to the user terminal, from device information pre-stored in the quantum key distribution network. The identity authentication fails if no wearable device having the quantum identity number is found. The device information pre-stored in the quantum key distribution network includes at least a quantum identity number of a wearable device registered in the quantum key distribution network.

Transmitting the identification information to the wearable device in step S2 includes: encrypting the identification information by using the second shared key. The second shared key is a shared key between the wearable device and the quantum key distribution network.

The wearable device receiving the identification information in step S3 includes: decrypting the identification information by using the second shared key.

Preferably, in step S3, the user terminal obtaining the identification information and transmitting verification information to the wearable device includes: the user terminal recognizing the identification information, to obtain a temporary session ID and device information included in the identification information; and the user terminal determining whether the device information included in the identification information is identical to the device information of the user terminal, determining whether the temporary session ID included in the identification information corresponds to the authentication request previously initiated by the user terminal to the target server, and transmitting a determination result as the verification information to the wearable device.

In step S3, before the wearable device transmitting the verification information to the quantum key distribution network, the method further includes the wearable device encrypting the verification information by using the second shared key.

In step S4, the quantum key distribution network receiving the verification information includes the quantum key distribution network decrypting the encrypted verification information by using the second shared key.

In step S4, generating the verification result based on the verification information includes: generating a verification result indicating successful authentication in a case that the device information included in the verification information is identical to the device information of the user terminal and the temporary session ID included in the verification information corresponds to the authentication request previously initiated by the user terminal to the target server; otherwise, generating a verification result indicating unsuccessful authentication.

In step S4, before transmitting the verification result to the target server, the method further includes: the quantum key distribution network encrypting the verification result by using the first shared key.

In step S5, the target server receiving the verification result includes: decrypting the encrypted verification result by using the first shared key.

In step S5, generating the identity authentication result and transmitting the identity authentication result to the user terminal includes: generating a message indicating successful authentication or unsuccessful authentication for login of the user terminal logs to the target server, and transmitting the message to the user terminal.

The message indicating successful authentication may include but is not limited to any one or more of a token, an expiration time, and a redirect address.

Once the authentication is completed, the authentication message is invalid immediately.

The temporary session ID is used only once. Once the identity authentication is completed, the temporary session ID is not reused no matter whether the identity authentication is successful or not. The temporary session ID established each time is different.

Preferably, the identification information is in a form of a QR code.

Preferably, in a case that the identification information is in the form of a QR code, the user terminal obtains information included in the identification information in an optical manner. In a case that the identification information is in other digital forms, the user terminal may obtain the information included in the identification information in other manners, such as wireless, Bluetooth, infrared, and a sound wave.

The identification information may be dynamic. For example, in the case that identification information is in the form of a QR code, after being generated on the wearable device, the QR code waits for a user to scan. If the user does not scan the QR code within a period of time, the quantum key distribution network regenerates a new QR code at time intervals, encrypts the regenerated QR code by using the quantum key shared with the wearable device, and issues the encrypted QR code to the wearable device for continuous dynamic update.

Optionally, in step S3, the wearable device further collects biometric information of the user and transmits the biometric information to the quantum key distribution network. Accordingly, in step S4, the quantum key distribution network matches the biometric information with pre-stored biometric information on receipt of the biometric information, and generates a verification result indicating successful authentication in a case that the matching for the biometric information succeeds, the device information included in the verification information is identical to the device information of the user terminal and the temporary session ID included in the verification information corresponds to the authentication request previously initiated by the user terminal to the target server.

Optionally, in an alternative implementation, step S3 is such simplified that the user terminal directly transmits the verification information to the quantum key distribution network. In this simplified solution, the key shared with the quantum key distribution network is required to be provided to the user terminal in advance.

Optionally, in an alternative implementation, in step S3, the user terminal obtaining the identification information and transmitting the verification information to the wearable device includes: the user terminal obtaining the identification information and transmitting all temporary session IDs currently initiated by the user terminal and the device information of the user terminal to the wearable device as the verification information.

Accordingly, in step S4, generating the verification result based on the verification information includes: the quantum key distribution network searching for, from all received temporary session IDs initiated by the user terminal and the device information, a combination of a temporary session ID and device information in which the device information is identical to the device information received in step S2 and the temporary session ID is identical to the temporary session ID received in step S2; the quantum key distribution network generating a verification result indicating successful authentication in a case that the combination is found; otherwise the quantum key distribution network generating a verification result indicating unsuccessful authentication.

Figure 3:
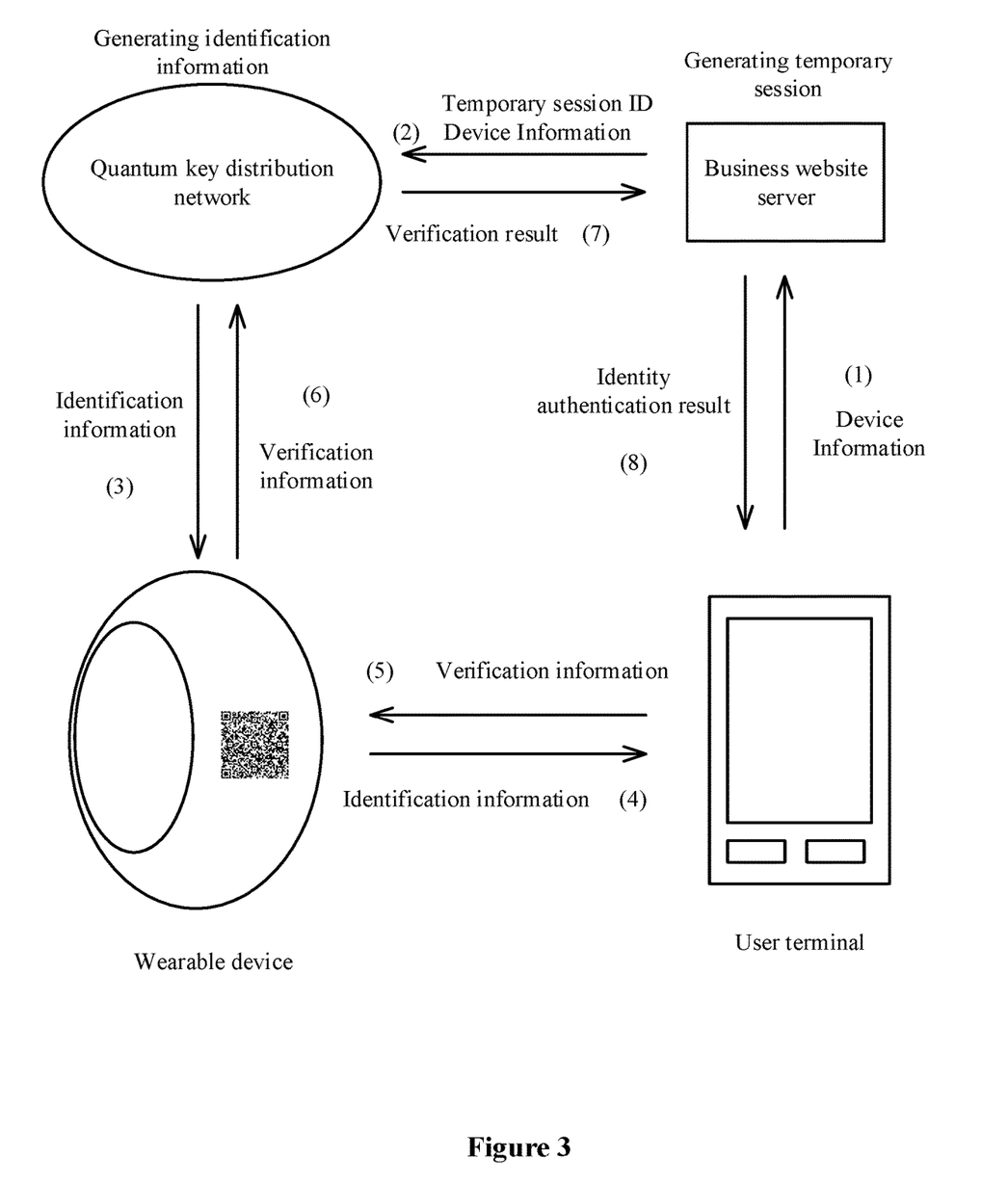
FIG. 3 is a schematic diagram showing an identity authentication process according to the first embodiment of the present disclosure.

In order to clarify the disclosure, this embodiment is described below with an example, which as shown in FIG. 3 includes steps (1) to (8).

In step (1), the user terminal accesses the target server and informs the server of an identity of the user terminal. The target server generates a temporary session for this login.

In step (2), the target server applies to the quantum key distribution network for authorization and authentication, encrypts information related to this temporary session and the identity of the user terminal by using the quantum key shared with the quantum key distribution network, and transmits the encrypted information related to this temporary session and the encrypted identity of the user terminal to the quantum key distribution network. The quantum key distribution network decrypts the encrypted information after receiving it, to restore the original information.

In step (3), the quantum key distribution network internally searches for the identity of the user terminal applying for login, and transmits a QR code for verification to a wearable device having the identity as identification information. The QR code includes relevant information identifying this temporary session and device information identifying the user terminal. The identification information is encrypted by the quantum key distribution network by using a preset quantum key shared with the wearable device and then is issued. After receiving the encrypted identification information, the wearable device decrypts the received encrypted identification information and restores the identification information.

In step (4), the user terminal scans the QR code to obtain information in the QR code in an optical manner.

In step (5), the user terminal determines whether an identity authentication request included in the QR code is initiated by itself based on the obtained information, generates verification information based on a determination result, and transmits the verification information to the wearable device.

In step (6), the wearable device encrypts the verification information by using the quantum key shared with the quantum key distribution network and transmits the encrypted verification information to the quantum key distribution network. The quantum key distribution network decrypts the encrypted verification information to restore the verification information, and generates a verification result based on the verification information.

In step (7), the quantum key distribution network encrypts the verification result by using the quantum key shared with the target server, and transmits the encrypted verification result to the target server. The target server obtains the verification result after decrypting the encrypted verification result.

In step (8), the target server generates a final identity authentication result based on the verification result and transmits the identity authentication result to the user terminal. After the authentication is completed, all intermediate information generated in the identity authentication is invalid immediately.

The identity authentication according to the present disclosure is particularly applicable to complex application scenarios. For example, in a case that one user terminal transmits two or more authentication requests in a short period of time (for example, applies for authorization for target server A, and then immediately applies for authorization for target server B), the quantum key distribution network may receive an authentication before a preceding authentication is completed. In this case, the two different authentication processes are distinguished from each other by using temporary session IDs, so as to ensure accuracy of identity authentication.

In a simplified solution of this embodiment, the user terminal initiates an authentication request, and cannot initiate another authentication request before the previously initiated authentication request is responded (that is, before the authentication passes or fails). That is, within a period of time, one user device only initiates one authentication request. In this case, the temporary session ID is not required for identification, and only the device information of the user terminal is required to identify this temporary session. Specifically, the simplified solution includes the following steps S1 to S5.

In step S1, the user terminal initiates an authentication request and provides device information of the user terminal to the target server. The target server receives the authentication request to generate a temporary session, and transmits the device information to the quantum key distribution network.

In step S2, the quantum key distribution network receives the device information to generate identification information, searches for a wearable device bound to the user terminal, and transmits the identification information to the wearable device.

In step S3, the wearable device receives the identification information and provides the identification information to the user terminal. The user terminal obtains the device information based on the identification information, determines whether the obtained device information is identical to the device information of the user terminal, and transmits a determination result to the wearable device as verification information. Then, the wearable device transmits the verification information to the quantum key distribution network.

In step S4, the quantum key distribution network receives the verification information, generates a verification result based on the verification information, and transmits the verification result to the target server. The quantum key distribution network generates a verification result indicating successful authentication in a case that the device information in the verification information is identical to the device information of the user terminal; otherwise, the quantum key distribution network generates a verification result indicating unsuccessful authentication.

In step S5, the target server receives the verification result to generate an identity authentication result, and transmits the identity authentication result to the user terminal.

Second Embodiment

Based on the identity authentication method according to the first embodiment, an identity authentication system based on a wearable device is further provided according to the present disclosure. The identity authentication system includes a user terminal, a target server, a quantum key distribution network and a wearable device.

The user terminal is configured to initiate an authentication request and provide device information of the user terminal to the target server, obtain identification information provided by the wearable device to the user terminal, transmit verification information to the wearable device, and receive an identity authentication result transmitted by the target server.

The target server is configured to receive the authentication request to generate a temporary session, transmit a temporary session ID and the device information to the quantum key distribution network, receive a verification result transmitted by the quantum key distribution network to generate the identity authentication result, and transmit the identity authentication result to the user terminal.

The quantum key distribution network is configured to receive the temporary session ID and the device information to generate the identification information, search for a wearable device bound to the user terminal, transmit the identification information to the wearable device, receive the verification information transmitted by the wearable device, generate the verification result based on the verification information, and transmit the verification result to the target server.

The wearable device is configured to receive the identification information, provide the identification information to the user terminal, receive the verification information transmitted by the user terminal, and transmit the verification information to the quantum key distribution network.

The target server may be capable of both identity authentication and providing service access to the user terminal. Alternatively, the target server may be capable of identity authentication only, and in a case that the target server determines that identity authentication is successful, other servers provide service access to the user terminal.

Optionally, the device information is a device ID of the user terminal or a quantum identity number. The quantum identity number is a unique identifier in an entire network distributed by the quantum key distribution network to a wearable device registered in the network. After the wearable device is bound to the user terminal, the quantum identity number is shared by the wearable device with the user terminal bound to the wearable device.

Optionally, after generating the temporary session, the target server feeds back the temporary session ID to the user terminal, that is, shares the temporary session ID with the user terminal.

Optionally, one way to search for the wearable device bound to the user terminal includes the following steps of: first, searching for a quantum identity number corresponding to the device ID of the user terminal in the quantum key distribution network based on the device ID of the user terminal; and then, searching for a wearable device having the quantum identity number, that is, a wearable device bound to the user terminal. Identity authentication fails if no wearable device having the quantum identity number is found. Device information pre-stored in the quantum key distribution network includes at least a quantum identity number of a wearable device registered in the quantum key distribution network in advance and a device ID of a user terminal bound to the wearable device.

Optionally, another way to search for the wearable device bound to the user terminal includes the following steps of: searching for, based on the quantum identity number from the user terminal, a wearable device having the quantum identity number, that is, a wearable device bound to the user terminal, from device information pre-stored in the quantum key distribution network. The identity authentication fails if no wearable device having the quantum identity number is found. The device information pre-stored in the quantum key distribution network includes at least a quantum identity number of a wearable device registered in the quantum key distribution network.

Preferably, the user terminal obtaining the identification information and transmitting the verification information to the wearable device includes: recognizing the identification information, and obtaining a temporary session ID and device information included in the identification information; and determining whether the device information included in the identification information is identical to the device information of the user terminal, determining whether the temporary session ID included in the identification information corresponds to the authentication request previously initiated by the user terminal to the target server, and transmitting a determination result as the verification information to the wearable device. The quantum key distribution network generates the verification result based on the verification information by: generating a verification result indicating successful authentication in a case that the device information included in the verification information is identical to the device information of the user terminal and the temporary session ID included in the verification information corresponds to the authentication request previously initiated by the user terminal to the target server; otherwise generating a verification result indicating unsuccessful authentication.

Optionally, the wearable device further collects biometric information of the user and transmits the biometric information to the quantum key distribution network. The quantum key distribution network matches the biometric information with pre-stored biometric information on receipt of the biometric information, and generates a verification result indicating successful authentication in a case that the matching for the biometric information succeeds, the device information included in the verification information is identical to the device information of the user terminal and the temporary session ID included in the verification information corresponds to the authentication request previously initiated by the user terminal to the target server.

Alternatively, the user terminal obtaining the identification information and transmitting the verification information to the wearable device includes: the user terminal obtaining the identification information and transmitting all temporary session IDs currently initiated by the user terminal and the device information of the user terminal to the wearable device as the verification information. The quantum key distribution network generating the verification result based on the verification information includes: the quantum key distribution network searching for, from all received temporary session IDs initiated by the user terminal and the device information, a combination of a temporary session ID and device information in which the device information is identical to the device information received from the target server and the temporary session ID is identical to the temporary session ID received from the target server; the quantum key distribution network generating a verification result indicating successful authentication in a case that the combination is found; otherwise the quantum key distribution network generating a verification result indicating unsuccessful authentication.

Preferably, the target server generating the identity authentication result and transmitting the identity authentication result to the user terminal includes: generating a message indicating successful authentication or unsuccessful authentication for login of the user terminal to the target server, and transmitting the message to the user terminal.

Preferably, the identification information may be in a form of a QR code. The QR code is dynamic. If the QR code is not scanned by a user within a period of time after being displayed on the wearable device, the quantum key distribution network regenerates a new QR code and transmits the new QR code to the wearable device.

Optionally, the devices communicate in the following manner:

the user terminal accesses the target server;

the quantum key distribution network and the target server both pre-store a first shared key for encrypting and decrypting communication data between the quantum key distribution network and the target server;

the wearable device and the quantum key distribution network both pre-store a second shared key for encrypting and decrypting communication data between the wearable device and the quantum key distribution network; and the wearable device is connected to the user terminal in a wireless manner or a wired manner.

Based on consideration of more secure communication requirements, the user terminal and the wearable device both are registered in the quantum key distribution network in advance, and obtain paired third shared keys for encrypting and decrypting communication data between the user terminal and the wearable device.

In a simplified solution of this embodiment, the user terminal initiates an authentication request, and cannot initiate another authentication request before the previously initiated authentication request is responded (that is, before the authentication passes or fails). That is, within a period of time, one user device only initiates one authentication request. In this case, the temporary session ID is not required for identification, and only the device information of the user terminal is required to identify this temporary session. Specifically, the system includes a user terminal, a target server, a quantum key distribution network and a wearable device.

The user terminal is configured to initiate an authentication request and provide device information of the user terminal to the target server, obtain identification information provided by the wearable device to the user terminal, obtain device information based on the identification information, determine whether the obtained device information is identical to the device information of the user terminal, transmit a determination result as verification information to the wearable device, and receive an identity authentication result transmitted by the target server The target server is configured to receive the authentication request to generate a temporary session, transmit the device information to the quantum key distribution network, receive a verification result transmitted by the quantum key distribution network to generate the identity authentication result, and transmit the identity authentication result to the user terminal.

The quantum key distribution network is configured to receive the device information, generate the identification information, search for a wearable device bound to the user terminal, transmit the identification information to the wearable device, receive the verification information transmitted by the wearable device, generate the verification result based on the verification information, and transmit the verification result to the target server. Specifically, the quantum key distribution network is configured to generate a verification result indicating successful authentication in a case that the device information included in the identification information is identical to the device information of the user terminal, otherwise generate a verification result indicating unsuccessful authentication.

The wearable device is configured to receive the identification information, provide the identification information to the user terminal, receive the verification information transmitted by the user terminal, and transmit the verification information to the quantum key distribution network.

Third Embodiment

Based on the identity authentication method according to the first embodiment, a quantum key distribution network for identity authentication is further provided according to this embodiment.

The quantum key distribution network is configured to: receive device information provided by a user terminal when the user terminal initiates an authentication request to a target server and a temporary session ID generated by the target server on receipt of the authentication request, and generate identification information based on the device information and the temporary session ID; search for a wearable device bound to the user terminal, and transmit the identification information to the wearable device; and receive verification information transmitted by the wearable device, generate a verification result based on the verification information, and transmit the verification result to the target server. The verification information is transmitted by the user terminal to the wearable device after obtaining the identification information from the wearable device.

Optionally, the device information is a device ID of the user terminal or a quantum identity number. The quantum identity number is a unique identifier in an entire network distributed by the quantum key distribution network to a wearable device registered in the network. After the wearable device is bond to the user terminal, the quantum identification number is shared by the wearable device with the user terminal bound to the wearable device.

One way to search for the wearable device bound to the user terminal includes the following steps of: first, searching for a quantum identity number corresponding to the device ID of the user terminal in the quantum key distribution network based on the device ID of the user terminal; and then, searching for a wearable device having the quantum identity number, that is, a wearable device bound to the user terminal. Identity authentication fails if no wearable device having the quantum identity number is found. Device information pre-stored in the quantum key distribution network includes at least a quantum identity number of a wearable device registered in the quantum key distribution network in advance and a device ID of a user terminal bound to the wearable device.

Another way to search for the wearable device bound to the user terminal includes the following steps of: searching for, based on the quantum identity number from the user terminal, a wearable device having the quantum identity number, that is, a wearable device bound to the user terminal, from device information pre-stored in the quantum key distribution network. The identity authentication fails if no wearable device having the quantum identity number is found. The device information pre-stored in the quantum key distribution network includes at least a quantum identity number of a wearable device registered in the quantum key distribution network.

After generating the temporary session, the target server shares the temporary session ID with the user terminal. The verification information includes all temporary session IDs currently initiated by the user terminal and the device information of the user terminal. The quantum key distribution network generating the verification result based on the verification information includes: the quantum key distribution network searching for, from all received temporary session IDs initiated by the user terminal and the device information, a combination of a temporary session ID and device information in which the device information is identical to the device information received from the target server and the temporary session ID is identical to the temporary session ID received from the target server; the quantum key distribution network generating a verification result indicating successful authentication in a case that the combination is found; otherwise, the quantum key distribution network generating a verification result indicating unsuccessful authentication.

Optionally, the quantum key distribution network and the target server both pre-store a first shared key for encrypting and decrypting communication data between the quantum key distribution network and the target server.

Optionally, the wearable device and the quantum key distribution network both pre-store a second shared key for encrypting and decrypting communication data between the wearable device and the quantum key distribution network.

In a simplified solution of this embodiment, the user terminal initiates an authentication request, and cannot initiate another authentication request before the previously initiated authentication request is responded (that is, before the authentication passes or fails). That is, within a period of time, one user device only initiates one authentication request. In this case, the temporary session ID is not required for identification, and only the device information of the user terminal is required to identify this temporary session. Specifically, the quantum key distribution network is configured to: receive device information provided by a user terminal when the user terminal initiates an authentication request to the target server, and generate identification information based on the device information; search for a wearable device bound to the user terminal, and transmit the identification information to the wearable device; and receive verification information transmitted by the wearable device, generate a verification result based on the verification information, and transmit the verification result to the target server, where the verification information is transmitted by the user terminal to the wearable device after obtaining the identification information from the wearable device. The quantum key distribution network is configured to generate a verification result indicating successful authentication in a case that the device information included in the verification information is identical to the device information of the user terminal, otherwise generate a verification result indicating unsuccessful authentication.

Fourth Embodiment

Based on the identity authentication method according to the first embodiment, a wearable device for identity authentication is further provided according to this embodiment. The wearable device is bound to a user terminal and is configured to: provide the user terminal with identification information transmitted by a quantum key distribution network, where the identification information is generated by the quantum key distribution network based on device information provided by the user terminal when the user terminal initiates an authentication request to a target server and a temporary session ID generated by the target server on receipt of the authentication request; and receive verification information transmitted by the user terminal after obtaining the identification information, and transmit the verification information to the quantum key distribution network for authentication.

Optionally, the wearable device is registered in the quantum key distribution network and stores a unique quantum identity number in the entire network, and is capable of storing keys, encrypting and decrypting data, and transmitting and receiving data.

Optionally, the identification information is in a form of a QR code.

Optionally, the wearable device further collects biometric information of a user and transmits the biometric information to the quantum key distribution network.

Optionally, the wearable device and the quantum key distribution network both pre-store a second shared key for encrypting and decrypting communication data between the wearable device and the quantum key distribution network.

Optionally, the user terminal and the wearable device both are registered in the quantum key distribution network in advance, and obtain paired third shared keys for encrypting and decrypting communication data between the user terminal and the wearable device.

In a simplified solution of this embodiment, the user terminal initiates an authentication request, and cannot initiate another authentication request before the previously initiated authentication request is responded (that is, before the authentication passes or fails).

That is, within a period of time, one user device only initiates one authentication request. In this case, the temporary session ID is not required for identification, and only the device information of the user terminal is required to identify this temporary session. Specifically, the wearable device is bound to a user terminal and is configured to: provide the user terminal with identification information transmitted by a quantum key distribution network, where the identification information is generated by the quantum key distribution network based on device information provided by the user terminal when the user terminal initiates an authentication request to a target server; and receive verification information transmitted by the user terminal after obtaining the identification information, and transmit the verification information to the quantum key distribution network for authentication.

Fifth Embodiment

Based on the identity authentication method according to the first embodiment, a user terminal is further provided according to this embodiment. The user terminal is bound to a wearable device, and is configured to: initiate an authentication request and provide device information of the user terminal to a target server; obtain identification information from the wearable device, transmit verification information to the wearable device, where the wearable device transmits the verification information to a quantum key distribution network for authentication to obtain a verification result, and the identification information is generated by the quantum key distribution network based on the device information provided by the user terminal when the user terminal initiates the authentication request to the target server and a temporary session ID generated by the target server on receipt of the authentication request; and receive an identity authentication result, where the identity authentication result is generated by the target server based on a verification result transmitted by the quantum key distribution network.

After generating a temporary session, the target server shares the temporary session ID with the user terminal. The verification information includes all temporary session IDs currently initiated by the user terminal and the device information of the user terminal.

Optionally, the user terminal and the wearable device both are registered in the quantum key distribution network in advance, and obtain paired third shared keys for encrypting and decrypting communication data between the user terminal and the wearable device.

In a simplified solution of this embodiment, the user terminal initiates an authentication request, and cannot initiate another authentication request before the previously initiated authentication request is responded (that is, before the authentication passes or fails). That is, within a period of time, one user device only initiates one authentication request. In this case, the temporary session ID is not required for identification, and only the device information of the user terminal is required to identify this temporary session. Specifically, the user terminal is bound to a wearable device, and is configured to: an initiate authentication request and provide device information of the user terminal to a target server;

obtain identification information from the wearable device, transmit verification information to the wearable device, where the wearable device transmits the verification information to a quantum key distribution network for authentication to obtain a verification result, the identification information is generated by the quantum key distribution network based on device information, and the device information is provided by the user terminal when initiating the authentication request to the target server; and receive an identity authentication result, where the identity authentication result is generated by the target server based on a verification result transmitted by the quantum key distribution network.

Sixth Embodiment

Based on the identity authentication method according to the first embodiment, a target server is further provided according to this embodiment. The target server is configured to: receive an authentication request transmitted by a user terminal and device information provided by the user terminal, generate a temporary session, and transmit a temporary session ID and the device information to a quantum key distribution network; and transmit an authentication result from the quantum key distribution network to the user terminal.

The target server is capable of both identity authentication and providing service access to the user terminal. Alternatively, the target server is capable of identity authentication only, and in a case that the target server determines that identity authentication is successful, other servers provide service access to the user terminal.

Optionally, the quantum key distribution network and the target server both pre-store a first shared key for encrypting and decrypting communication data between the quantum key distribution network and the target server.

In a simplified solution of this embodiment, the user terminal initiates an authentication request, and cannot initiate another authentication request before the previously initiated authentication request is responded (that is, before the authentication passes or fails). That is, within a period of time, one user device only initiates one authentication request. In this case, the temporary session ID is not required for identification, and only the device information of the user terminal is required to identify this temporary session. Specifically, the target server is configured to: receive an authentication request transmitted by a user terminal and device information provided by the user terminal, and transmit the device information to a quantum key distribution network; and transmit an authentication result from the quantum key distribution network to the user terminal.

For user authentication according to the present disclosure, an encryption method based on complexity of mathematical algorithms is replaced with a one-time-pad method based on symmetric quantum key(s), which improves security. A wearable device is introduced to login authentication with a target server, which enhances user experience. The quantum cryptography technology is organically combined with the wearable device, so that reliability of identity authentication between devices as well as identity authentication between a human and a device are significantly improved. In this way, a complete and reliable authentication link from the human (user) to a remote business server is established, thereby paving the way for "last kilometer" security.

The quantum key is used in a one-time-pad manner. However, the security requirements may be lowered so that the key no longer strictly follows the one-time-pad manner, or based on this embodiment, the quantum key may be replaced with other keys, which should also be considered as being within the protection scope of the present disclosure.

Those skilled in the art should understand that the above modules or steps in the present disclosure may be implemented by a general-purpose computer apparatus. Optionally, the above modules or steps may be implemented by program codes executable by a computing apparatus, so that the program codes may be stored in a storage apparatus and executed by the computing apparatus. Alternatively, the above modules or steps may be implemented as individual integrated circuit modules, or multiple modules or steps among the above modules or steps may be implemented as a single integrated circuit module. The present disclosure is not limited to any specific combination of hardware and software.

Although specific embodiments of the present disclosure are described above with reference to the drawings, the protection scope of the present disclosure is not limited thereto. Those skilled in the art should understand that, based on the technical solutions of the present disclosure, various modifications or variants that are made without any creative effort are also within the protection scope of the present disclosure.

The invention claimed is:

1. A wearable-device-based identity authentication method, comprising the steps of:
   S1: initiating an authentication request and providing device information of a user terminal, by the user terminal, to a target server; and receiving, by the target server, the authentication request to generate a temporary session, and transmitting, by the target server, a temporary session ID and the device information to a quantum key distribution network;
   S2: receiving, by the quantum key distribution network, the temporary session ID and the device information to generate identification information, searching for, by the quantum key distribution network, a wearable device bound to the user terminal, and transmitting, by the quantum key distribution network, the identification information to the wearable device;
   S3: receiving, by the wearable device, the identification information, and providing, by the wearable device, the identification information to the user terminal; obtaining, by the user terminal, the identification information, and transmitting, by the user terminal, verification information to the wearable device; and transmitting, by the wearable device, the verification information to the quantum key distribution network;
   S4: receiving, by the quantum key distribution network, the verification information, and generating, by the quantum key distribution network, a verification result based on the verification information, and transmitting, by the quantum key distribution network, the verification result to the target server; and
   S5: receiving, by the target server, the verification result, generating, by the target server, an identity authentication result, and transmitting, by the target server, the identity authentication result to the user terminal.

2. The method according to claim 1, wherein the device information is a device ID of the user terminal or a quantum identity number, the quantum identity number is a unique identifier in an entire network distributed by the quantum key distribution network to the wearable device registered in the network, and the quantum identity number is shared by the wearable device with the user terminal bound to the wearable device after the wearable device is bound to the user terminal.

3. The method according to claim 2, wherein in a case that the device information is the device ID of the user terminal, searching for the wearable device bound to the user terminal in step S2 comprises:
   first, searching for a quantum identity number corresponding to the device ID of the user terminal in the quantum key distribution network based on the device ID of the user terminal; and
   then, searching for a wearable device having the quantum identity number, the wearable device bound to the user terminal being the wearable device having the quantum identity number, wherein identity authentication fails in a case that no wearable device having the quantum identity number is found, and device information pre-stored in the quantum key distribution network comprises at least the quantum identity number of the wearable device registered in the quantum key distribution network in advance and the device ID of the user terminal bound to the wearable device.

4. The method according to claim 2, wherein in a case that the device information is the quantum identity number, searching for the wearable device bound to the user terminal in step S2 comprises:
   searching for, based on the quantum identity number from the user terminal, a wearable device having the quantum identity number, the wearable device bound to the user terminal being the wearable device having the quantum identity number, from device information pre-stored in the quantum key distribution network, wherein identity authentication fails in a case that no wearable device having the quantum identity number is found, and device information pre-stored in the quantum key distribution network comprises at least the quantum identity number of the wearable device registered in the quantum key distribution network.

5. The method according to claim 1, wherein in step S3, obtaining, by the user terminal, the identification information, and transmitting, by the user terminal, the verification information to the wearable device comprise:
   recognizing, by the user terminal, the identification information, and obtaining, by the user terminal, a temporary session ID and device information comprised in the identification information; and
   determining, by the user terminal, whether the device information comprised in the identification information is identical to the device information of the user terminal, determining, by the user terminal, whether the temporary session ID comprised in the identification information corresponds to the authentication request previously initiated by the user terminal to the target server, and transmitting, by the user terminal, a determination result as the verification information to the wearable device.

6. The method according to claim 5, wherein in step S4, generating, by the quantum key distribution network, the verification result based on the verification information comprises:
   generating a verification result indicating successful authentication in a case that the device information comprised in the verification information is identical to the device information of the user terminal and the temporary session ID comprised in the verification information corresponds to the authentication request previously initiated by the user terminal to the target server; otherwise, generating a verification result indicating unsuccessful authentication.

7. The method according to claim 5, wherein step S3 further comprises: collecting, by the wearable device, biometric information of a user, and transmitting, by the wearable device, the biometric information to the quantum key distribution network, wherein
   the quantum key distribution network matches the biometric information with pre-stored biometric information on receipt of the biometric information, generates a verification result indicating successful authentication in a case that the matching for the biometric information succeeds, the device information comprised in the verification information is identical to the device information of the user terminal and the temporary session ID comprised in the verification information corresponds to the authentication request previously initiated by the user terminal to the target server, otherwise generates a verification result indicating unsuccessful authentication.

8. The method according to claim 1, wherein
the target server shares the temporary session ID with the user terminal after generating the temporary session; and in step S3, obtaining, by the user terminal, the identification information, and transmitting, by the user terminal, the verification information to the wearable device comprise:

obtaining, by the user terminal, the identification information, and transmitting, by the user terminal, all temporary session IDs currently initiated by the user terminal and the device information of the user terminal to the wearable device as the verification information.

9. The method according to claim 8, wherein in step S4, generating the verification result based on the verification information comprises:

searching for, by the quantum key distribution network from all received temporary session IDs initiated by the user terminal and the device information, a combination of a temporary session ID and device information in which the device information is identical to the device information received in step S2 and the temporary session ID is identical to the temporary session ID received in step S2;

generating, by the quantum key distribution network, a verification result indicating successful authentication in a case that the combination is found;

otherwise, generating, by the quantum key distribution network, a verification result indicating unsuccessful authentication.

10. The method according to claim 1, wherein the identification information is in a form of a QR code.

11. The method according to claim 10, wherein the QR code is dynamic, and in a case that the QR code is not scanned by a user within a period of time after being displayed on the wearable device, the quantum key distribution network regenerates a new QR code at time intervals and transmits the new QR code to the wearable device for continuous dynamic update.

12. A wearable-device-based identity authentication system, comprising a user terminal, a target server, a quantum key distribution network and a wearable device, wherein the user terminal is configured to initiate an authentication request and provide device information of the user terminal to the target server, obtain identification information provided by the wearable device to the user terminal, transmit verification information to the wearable device, and receive an identity authentication result transmitted by the target server;

the target server is configured to receive the authentication request to generate a temporary session, transmit a temporary session ID and the device information to the quantum key distribution network, receive a verification result transmitted by the quantum key distribution network to generate the identity authentication result, and transmit the identity authentication result to the user terminal;

the quantum key distribution network is configured to receive the temporary session ID and the device information to generate the identification information, search for a wearable device bound to the user terminal, transmit the identification information to the wearable device, receive the verification information transmitted by the wearable device, generate the verification result based on the verification information, and transmit the verification result to the target server; and the wearable device is configured to receive the identification information, provide the identification information to the user terminal, receive the verification information transmitted by the user terminal, and transmit the verification information to the quantum key distribution network.

13. The system according to claim 12, wherein the device information is a device ID of the user terminal or a quantum identity number, the quantum identity number is a unique identifier in an entire network distributed by the quantum key distribution network to the wearable device registered in the network, and the quantum identity number is shared by the wearable device with the user terminal bound to the wearable device after the wearable device is bound to the user terminal.

14. The system according to claim 12, wherein the identification information is in a form of a QR code.

15. A wearable device for identity authentication, comprising a processor and a memory having executable instructions stored thereon, wherein when executed by the processor, the executable instructions cause the processor to:

provide a user terminal with identification information transmitted by a quantum key distribution network, wherein the wearable device is bound to the user terminal; and receive verification information transmitted by the user terminal after obtaining the identification information, and transmit the verification information to the quantum key distribution network for authentication, wherein the quantum key distribution network receives the device information provided by the user terminal when the user terminal initiates an authentication request to a target server and a temporary session ID generated by the target server on receipt of the authentication request, and the identification information is generated based on the device information and the temporary session ID.

16. The wearable device for identity authentication according to claim 15, wherein the user terminal provides device information when initiating an authentication request to a target server, and the identification information is generated based on the device information.

17. The wearable device for identity authentication according to claim 15, wherein the wearable device is registered in the quantum key distribution network, stores a unique quantum identity number in the entire quantum key distribution network, and is capable of storing keys, encrypting and decrypting data, and transmitting and receiving data.

18. The wearable device for identity authentication according to claim 15, wherein the wearable device is further configured to collect biometric information of a user, and transmit the biometric information to the quantum key distribution network.

19. The wearable device for identity authentication according to claim 15, wherein the identification information is in a form of a QR code.

* * * * *